US012401849B2

(12) United States Patent
Li

(10) Patent No.: US 12,401,849 B2
(45) Date of Patent: Aug. 26, 2025

(54) SYSTEMS AND METHODS FOR ENHANCING GROUP MEDIA SESSION INTERACTIONS

(71) Applicant: Adeia Guides Inc., San Jose, CA (US)

(72) Inventor: Zhiyun Li, Kenmore, WA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/087,007

(22) Filed: Dec. 22, 2022

(65) Prior Publication Data

US 2024/0214633 A1 Jun. 27, 2024

(51) Int. Cl.
*H04N 21/442* (2011.01)
*H04L 65/1089* (2022.01)
*H04L 65/403* (2022.01)

(52) U.S. Cl.
CPC ... *H04N 21/44218* (2013.01); *H04L 65/1089* (2013.01); *H04L 65/403* (2013.01)

(58) Field of Classification Search
CPC .......... H04N 21/44218; H04N 21/4223; H04L 65/1089; H04L 65/403
USPC .......................................................... 725/10
See application file for complete search history.

(56) References Cited

U.S. PATENT DOCUMENTS

| 11,159,458 | B1 * | 10/2021 | Johnson | H04L 51/10 |
| 11,758,245 | B2 * | 9/2023 | Marten | H04N 21/8545 |
| | | | | 725/32 |
| 2016/0142767 | A1 * | 5/2016 | Shigeta | H04N 21/4788 |
| | | | | 725/12 |
| 2022/0248080 | A1 * | 8/2022 | Strickland | H04N 21/242 |

OTHER PUBLICATIONS

Bird et al., "Natural Language Processing with Python," (29 pages) (https://www.nltk.org/book/ch06.html) (undated).
Anonymous, "Topic Analysis: The Ultimate Guide," (41 pages) (undated) (https://monkeylearn.com/topic-analysis/).
Azevedo et al., "Exploring NLP and Information Extraction to Jointly Address Question Generation and Answering," Artificial Intelligence Applications and Innovations, Conference Paper, (2020) (30 Pages).
Cui et al., "OneStop QAMaker: Extract Question-Answer Pairs from Text in a One-Stop Approach," arXiv:2102.12128 [cs.CL], Woodstock, Jun. 3-5, 2018 (8 pages) (2018).

(Continued)

*Primary Examiner* — Adil Ocak
(74) *Attorney, Agent, or Firm* — Haley Guiliano LLP

(57) ABSTRACT

Systems and methods are provided for enabling enhanced group media session interactions. A group session for consuming a media content item is initiated between first and second computing devices, and a portion of the media content item is received at the computing devices. A reaction of a first user is captured based at least in part on receiving the portion of the media content item. A trigger condition is identified, and it is determined that the captured reaction satisfies the trigger condition. In response to determining that the captured reaction satisfies the trigger condition, a prompt that is based on the portion of the media content item and the captured reaction is generated. A computing device is identified, and at least one of the portion of the media content item, the captured reaction, or the prompt is transmitted to the identified computing device and is generated for output.

20 Claims, 11 Drawing Sheets

(56) References Cited

OTHER PUBLICATIONS

Du et al., "Learning to Ask: Neural Question Generation for Reading Comprehension," Computer Science, Computation and Language (2017) (11 pages).
Foster, "Text Summarization for NLP: 5 Best APIs, AI Models, and AI Summarizers in 2023," AssemblyAI (12 pages) (2022).
Galley et al., "Identifying Agreement and Disagreement in Conversational Speech: Use of Bayesian Networks to Model Pragmatic Dependencies," Presentations (Cummunicative Events) (https://doi.org/10.3115/1218955.1219040) (8 pages) (2004).
Meng et al., "Dialogue Intent Classification with Long Short-Term Memory Networks," Natural Language Processing and Chinese Computing, Conference paper (9 pages) (2018).
Rakangor et al., "Literature Review of Automatic Question Generation Systems," International Journal of Scientific and Research Publications, 5(1):1-5 (2015).
Singh, "The Ultimate Guide to Emotion Recognition from Facial Expressions using Python," (2021) (https://towardsdatascience.com/the-ultimate-guide-to-emotion-recognition-from-facial-expressions-using-python-64e58d4324ff) (17 pages).
Wu et al., "Interruption Point Detection of Spontaneous Speech Using Inter-Syllable Boundary-Based Prosodic Features," ACM Transactions on Asian Language Information Processing, 10(1-Article No. 6):1-21 (2011).

\* cited by examiner

SYSTEMS AND METHODS FOR ENHANCING GROUP MEDIA SESSION INTERACTIONS

BACKGROUND

The present disclosure is directed towards systems and methods for enhancing group media session interactions. In particular, systems and methods are provided herein that enable at least one of a portion of a media content item being transmitted during a group media session; a reaction captured during the group media session; or a prompt, generated based on the media content item and the captured reaction, to be transmitted to an identified computing device.

SUMMARY

With the proliferation of over-the-top (OTT) platforms, users have required different ways to consume content items. One way that OTT providers have responded is to enable users to consume content items at the same time via a watch party, or group watch. Such a feature enables, for example, friends to watch the same content together at the same time, but on devices at different locations. In some examples, control of a content item being consumed may synchronized. For example, if one user pauses a content item during a group watch session, it is paused for all users. Additional features include, for example, a chat and/or reactions that are shared with participants of the group watch session. However, despite the shared experience, there may be a relatively low level of engagement between watch party participants during, and after, a watch party.

To help address these problems, systems and methods are provided herein that enable at least one of a portion of a media content item being transmitted during a group media session; a reaction captured during the group media session; or a prompt, generated based on the media content item and the captured reaction, to be transmitted to an identified computing device.

Systems and methods are described herein for enhancing group media session interactions. In accordance with some aspects of the disclosure, a method is provided. The method includes initiating a group session for consuming a media content item between a first computing device and a second computing device. A portion of the media content item is received at the first computing device and the second computing device, and a reaction of a first user is captured based at least in part on receiving the portion of the media content item. A trigger condition is identified, and it is determined that the captured reaction satisfies the trigger condition. A prompt that is based on the portion of the media content item and the captured reaction is generated in response to determining that the captured reaction satisfies the trigger condition. A computing device is identified, and at least one of the portion of the media content item, the captured reaction, or the prompt is transmitted to the identified computing device. The at least one of the portion of the media content item, the captured reaction, or the prompt is caused to be generated for output at the identified computing device. All of the steps described may be performed in their entirety on a client-side computing device. In another example, all of the steps described may be performed in their entirety on a server-side computing device. In some examples, the steps described may be performed, in part, on a client-side computing device and, in part, on a server-side computing device.

In an example system, a watch party is initiated between two friends at their respective smart televisions. The friends may initiate the watch party via an OTT platform application running on the respective smart televisions and they may choose to watch a movie together. On starting the watch party the movie is streamed at the same time, or substantially the same time, to the smart televisions. One of the friends may start laughing at a funny part of the movie, and the laughing may be captured via a camera associated with the smart television. Machine vision may be utilized to determine that the capture comprises a person laughing, and, in response to the laughing, it may be determined that a trigger condition is met. A prompt is generated and may comprise a phrase such as "Wasn't this part of the movie funny?!" The prompt, along with the capture and a corresponding segment of the movie, may be transmitted to smartphones associated with the two friends. This transmitting may take place after the movie, and/or the watch party, has finished.

Supplemental content may be identified based on the captured reaction, the supplemental content may be transmitted to the identified computing device, and the supplemental content may be generated for output at the identified computing device. The supplemental content may be interactive supplemental content comprising an interactive object. Input associated with the interactive object may be received at the identified computing device, and additional supplemental content associated with the interactive object may be generated for output at the identified computing device.

Receiving a portion of the media content item may further comprise receiving a plurality of portions of the media content item, and capturing a reaction of the first user may further comprise capturing a plurality of reactions of the first user. A first time period may be identified, and each of the plurality of portions of the media content item and each of the plurality of captured reactions for the first time period may be saved. For each saved portion of the plurality of portions and each captured reaction of the plurality of captured reactions a plurality of steps may be performed.

For each captured reaction, determining that a captured reaction satisfies the trigger condition may further comprise determining that the saved captured reaction satisfies the trigger condition. Each captured reaction may be retained at the end of the first time period, and a prompt may be generated based on each saved captured reaction. Each saved captured reaction may be transmitted to the identified computing device, and at least one of the saved captured reactions may be generated for output at the identified computing device.

Each saved portion of the media content item may be retained at the end of the first time period, and a prompt may be generated further based on each saved portion of the media content item. Each saved portion of the media content item may be transmitted to the identified computing device, and at least one of the portions of the media content item may be generated for output at the identified computing device.

Retaining the saved portion of the media content item and the captured reaction may further comprise a plurality of steps. A second time period may be identified, and one or more additional portions of the media content item and/or additional captured reactions during the second time period may be saved. The second time period may start at time based on determining that the captured reaction satisfies the trigger condition. Transmitting the saved portion of the media content item, the saved captured reaction and the prompt may further comprise transmitting the one or more additional portions of the media content item and/or additional captured reactions. Generating for output the at least one of the saved portion of the media content item, the saved captured reaction and the prompt may further comprise generating for output the one or more additional portions of the media content item and/or additional captured reactions.

The portion of the media content item may be saved. Start time metadata associated with a start time of the media content item may be identified, and end time metadata associated with an end time of the media content item may be identified. The start time metadata and the end time metadata may be saved.

A communication may be received, where the communication is a communication transmitted from a first user associated with the first computing device to a second user associated with the second computing device. The communication may be analyzed with a language processing algorithm, and determining that the captured reaction satisfies the trigger condition may further comprises determining that the received communication satisfies the trigger condition.

A capture of a user face may be received, and the capture of the user face may be analyzed with a computer vision algorithm. Determining that the captured reaction satisfies the trigger condition may further comprise determining that the capture of the user face satisfies the trigger condition. Input from a wearable computing device may be received, and the input from the wearable computing device may be analyzed. Determining that the captured reaction satisfies the trigger condition may further comprise determining that the input from the wearable computing device satisfies the trigger condition.

Generating the prompt may further comprise generating, with a language processing algorithm, a question.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which.

DETAILED DESCRIPTION

Figure 1:
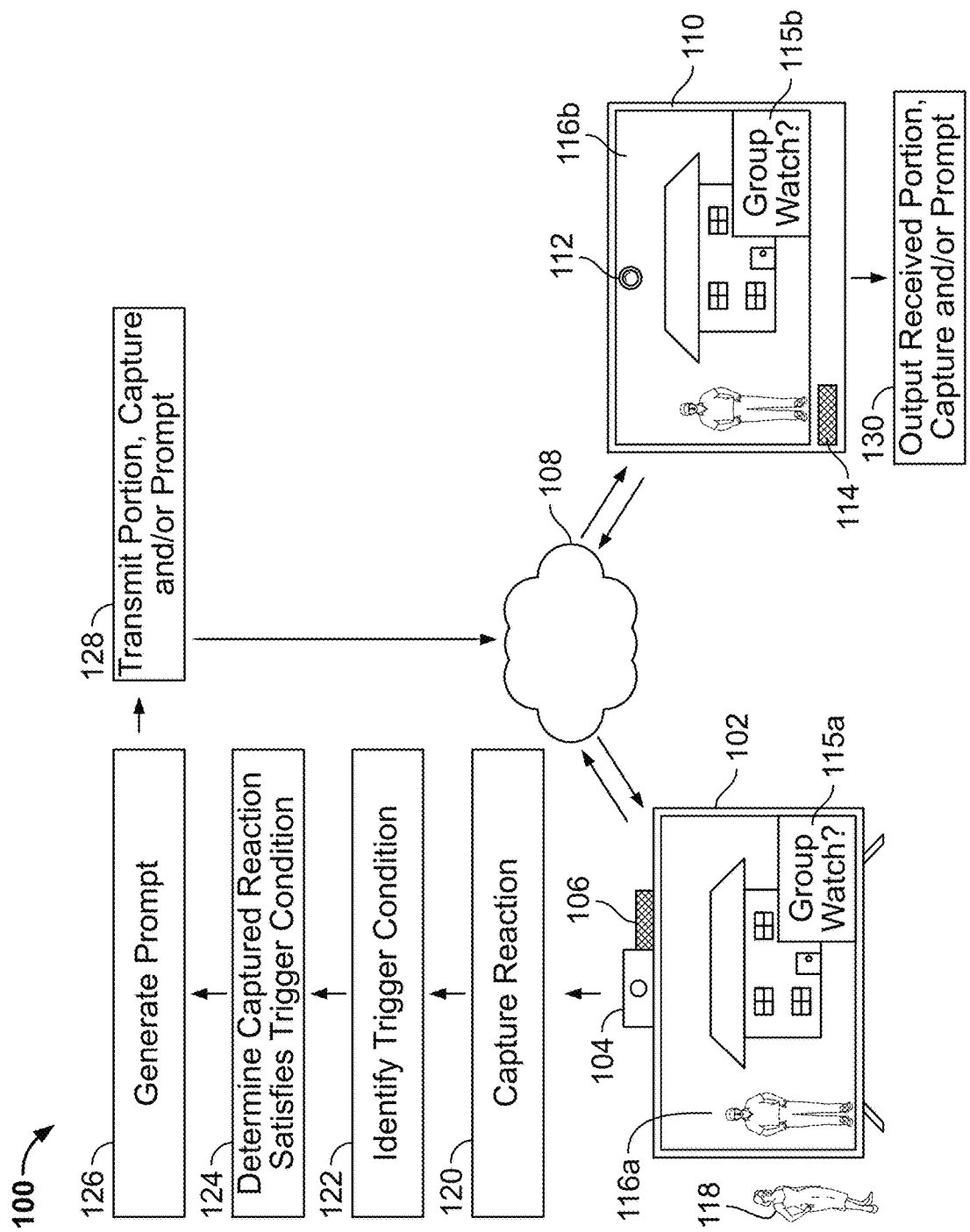
FIG. 1 shows an example environment for enabling enhanced group media session interactions, in accordance with some embodiments of the disclosure.

Systems and methods are provided herein that enable at least one of a portion of a media content item being transmitted during a group media session; a reaction captured during the group media session; or a prompt, generated based on the media content item and the captured reaction, to be transmitted to an identified computing device. A media content item, or content item, includes audio, video, text, a video game and/or any other media content. A content item may be a single media item. In other examples, it may be a series (or season) of episodes of content items. Audio includes audio-only content, such as podcasts. Video includes audiovisual content such as movies and/or television programs. Text includes text-only content, such as event descriptions. One example of a suitable media content item is one that complies with the MPEG DASH standard. An OTT, streaming and/or VOD service (or platform) may be accessed via a website and/or an app running on a computing device, and the device may receive any type of content item, including live content items and/or on-demand content items. Content items may, for example, be streamed to physical computing devices. In another example, content items may, for example, be streamed to virtual computing devices in, for example, an augmented environment, a virtual environment and/or the metaverse.

A group session, group watch, group watch session, or watch party, enables a content item to be received and output at participating computing devices at the same time, or substantially the same time. In some examples, a group session may be an audio-only group session, where the content item is an audio book. In some examples, any actions, such as pausing and/or fast-forwarding that may be performed at any participating computing device may be performed at all of the participants in the group session. For example, if one participant pauses the content item, it may be paused for all participants. Group sessions can take place on a local network, where two or more of the participants are located in a similar area, or the participants can be remote to each other, and the group watch session can take place via a network such as the internet. Although the examples discussed herein predominantly discuss group sessions comprising two computing devices, a group session may comprise any number of computing devices, and all of the examples discussed herein can be implemented on any number of computing devices.

A prompt is any word and/or phrase that may generate further interactions between one or more participants of a group session. In some examples, a prompt may be generated based on unanswered questions that arose during a group session. For example, one viewer asked "What kind of car is that?" but no one answered. In another example, a user may recognize a familiar actor's face, but could not recall which movie they acted in before. In another example, a prompt may be based on inconsistent reactions from different viewers at the same moment in a content item. For example, for a funny moment in the content item, some of viewers may have laughed, but other viewers were confused. In this example, some viewers did not understand the joke, so a prompt could be based on encouraging the joke to be explained. In another example, a prompt may be generated based on strong and consistent reactions. For example, a prompt may be based on a palm-on-face, screaming and/or laughing. In some examples, a prompt may be based on interrupted interactions during the watch party. For example, one viewer asked others to refocus on movie. This may be indicated by a phrase such as, "Shh! Be quiet." In a further example, a prompt may be based on multiple parallel social interactions during the group session. For example, a first viewer was talking with a second viewer about a first topic, and at the same moment, a third viewer was talking with a fourth viewer about a second topic in parallel. In another example, a prompt may be based on a disagreement between viewers. For example, a first viewer may predict a first scenario for how the content item may proceed, whereas a second viewer may predict a second scenario. In another example, some viewers may not agree with what happened in a content item by saying, for example, "Oh, I cannot believe he did that, seriously?" In some examples, a prompt may be based on missed moments for some viewers. For example, if a viewer goes to restroom, gets a drink, takes care of a baby, falls to sleep and/or gets distracted. A missed moment can, for example, be detected by a camera, motion sensors and/or brainwave monitoring. In another example, a prompt can be based on an intentional placeholder that suggests that a viewer intends to continue a conversation after the group session. For example, a first viewer one viewer may have said "Aha, that reminds me my childhood, I will tell you later." In another example, a viewer may propose a vacation plan, e.g., "We should plan to visit there this summer."

The disclosed methods and systems may be implemented on one or more computing devices. As referred to herein, the computing device can be any device comprising a processor and memory, for example, a television, a smart television, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, a smartwatch, a smart speaker, an augmented reality device, a mixed reality device, a virtual reality device, a gaming console, or any other television equipment, computing equipment, or wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), etc.

FIG. 1. shows an example environment for enabling enhanced group media session interactions, in accordance with some embodiments of the disclosure. The environment 100 comprises a first computing device, in this example first smart television 102, that communicates via network 108 with a second computing device, in this example second smart television 110. The network 108 may be any network including, for example, the internet. The network 108 may comprise wired and/or wireless means. The first smart television 102 comprises a first integrated camera 104 and a first integrated microphone 106. The second smart television 110 comprises a second integrated camera 112 and a second integrated microphone 114. Although both the first and second smart televisions 102, 110 are shown with integrated cameras 104, 112 and microphones 106, 114, in other examples, one or more of the cameras and/or microphones may be external and/or not present at all. A group session is initiated between the two smart televisions 102, 110 via user interface elements 115a, 115b. Although a group session is shown between two computing devices in this example, a group session may be formed between any number of computing devices for this example, or any other example described herein (e.g., those discussed in connection with FIGS. 2-8). In some examples, a group session may be formed between three, five, nine, 15, 20 and/or 50 computing devices. In other examples, any known way of initiating a group session may be utilized. On initiating the group session, the first and second smart televisions receive one or more portions of the content item 116a, 116b and display the received portions at the same time, or substantially the same time. The content item 116a, 116b may be received via network 108. While the content item 116a is being displayed at the first smart television 102, a first user 118 watches the content item 116a, and at 120, a reaction of the user is captured. In some examples, captures may be taken in a continuous manner. In other examples, captures may be taken at set periods, for example, every one, two, five and/or ten seconds. In a further example, a content item may comprise metadata indicating that it is likely that a user will react to a portion of the content item, and a capture may be taken in response to the metadata being processed. In this example, a capture is only taken for the first user; however, captures may be taken for any other user (not shown) participating in the group session, in this or any other example discussed herein (e.g., those discussed in connection with FIGS. 2-8).

At 122, a trigger condition is identified. For example, a trigger condition may comprise identifying whether a user is crying at a sad part of a movie. At 124, it is determined whether the captured reaction satisfies the trigger condition, for example it is determined that the user was crying at a sad part of the movie. If the trigger condition is satisfied, at 126, a prompt is generated based on the captured reaction. For example, the prompt may comprise "That part of the movie was sad, are you OK now?" In some examples, the smart television 102 may comprise an artificial intelligence processor, such as a Google Tensor processor and/or a Samsung Exynos processor. The artificial intelligence processor may be utilized at steps 124 and/or 126.

At 128, at least one of the portion of the media content item 116, the captured reaction and/or the prompt is transmitted to another computing device. In this example, at least one of the portion of the media content item 116, the captured reaction and/or the prompt is transmitted to the second smart television 110 via, for example, the network 108. On receiving the at least one of the portion of the media content item 116, the captured reaction and/or the prompt, it, or they, are output 130 at the second smart television 110. In any arrangement discussed herein, a computing device to transmit at least one of the portion of the media content item 116, the captured reaction and/or the prompt to may be identified. In any arrangement discussed herein, a computing device may be identified by virtue of it being a member of a group media session. In another example that may be implemented by any arrangement discussed herein, a user may log onto an OTT platform, and the user may associate a social media account with the OTT platform. A computing device that is running an application associated with the social media account may be identified to receive the at least one of the portion of the media content item 116, the captured reaction and/or the prompt. In another example, the captured reaction and/or the prompt may be published to a social media account and/or page. In a further example, that may be implemented by any arrangement discussed herein, a computing device may be identified via, for example, Bluetooth and/or being on the same network as the computing device participating in the group media session. A particular computing device may be identified if, for example, the computing device is associated with a user in the captured reaction and/or the prompt. For example, facial recognition may be used to identify a user in a profile photo associated with a social media account, and a user in the captured reaction. In another example, the reaction may comprise a message transmitted from a first computing device to a second computing device, and the portion of the media content item 116, the captured reaction and/or the prompt may be transmitted to those first and/or second computing devices. The steps of capturing 120 the reaction, identifying 122 the trigger condition, determining 124 that the captured reaction satisfies the trigger condition, generating 126 the prompt and transmitting 128 the portion of the content item, captured reaction and/or prompt may be carried out at the smart television (or computing device) 102.

Figure 2:
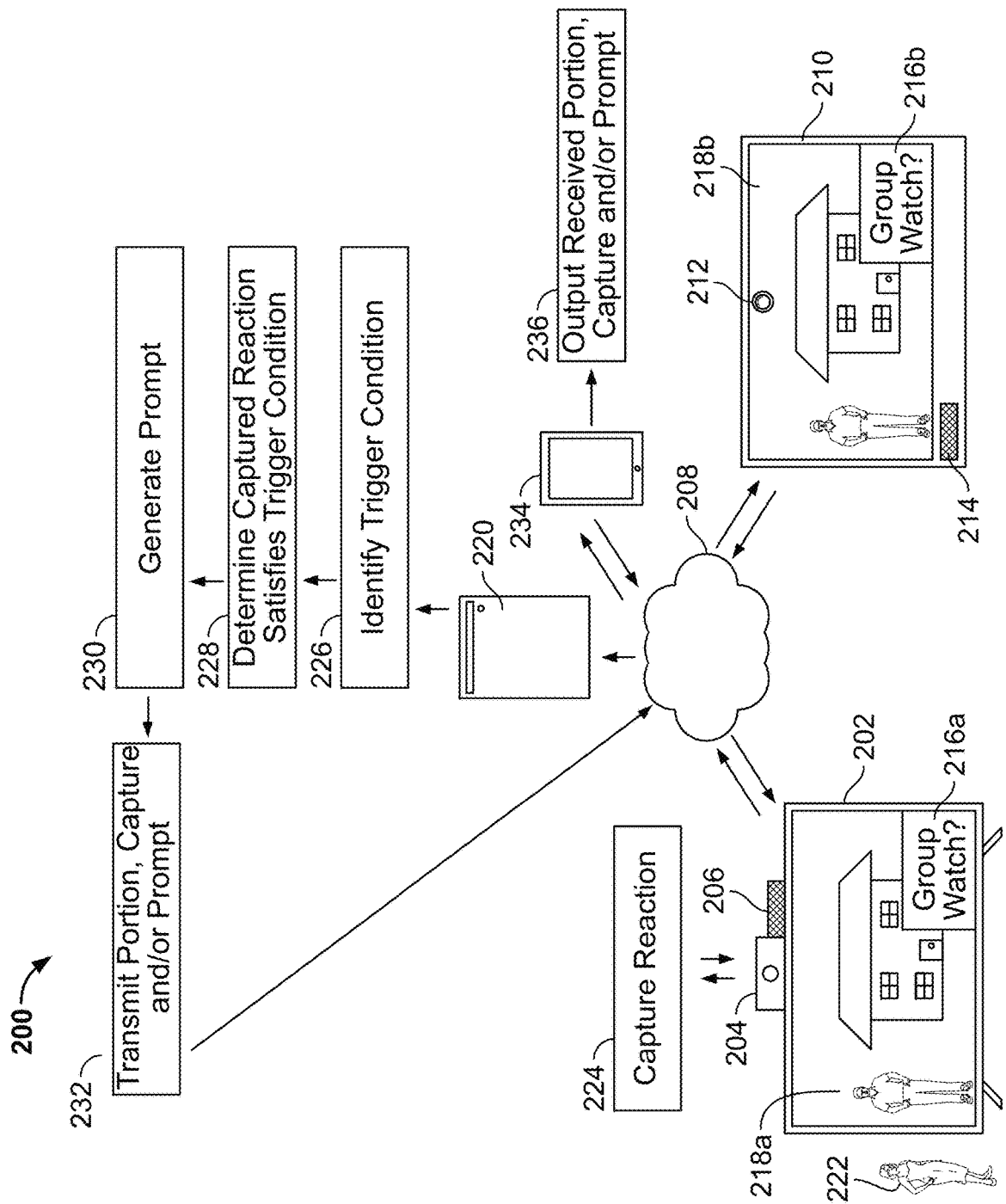
FIG. 2 shows another example environment for enabling enhanced group media session interactions, in accordance with some embodiments of the disclosure.

FIG. 2 shows another example environment for enabling enhanced group media session interactions, in accordance with some embodiments of the disclosure. In a similar manner to the environment shown in FIG. 1, the environment 200 comprises a first computing device, in this example first smart television 202, a second computing device, in this example second smart television 210, and a server 220 that all communicate via network 208. Again, the network 208 may be any network including, for example, the internet. The first smart television 202 comprises a first integrated camera 204 and a first integrated microphone 206. The second smart television 210 comprises a second integrated camera 212 and a second integrated microphone 214. Although both the first and second smart televisions 202, 210 are shown with integrated cameras 204, 212 and microphones 206, 214, in other examples, one or more of the cameras and/or microphones may be external and/or not present at all. A group session is initiated between the two smart televisions 202, 210 via user interface elements 216a, 216b and server 220. In other examples, any known way of initiating a group session may be utilized. On initiating the group session, the first and second smart televisions receive one or more portions of the content item 218a, 218b and display the received portions at the same time, or substantially the same time. The content item 218a, 218b may be received via network 208 and from the server 220. While the content item 218a is being displayed at the first smart television 202, a first user 222 watches the content item 218a, and at 224, a reaction of the user is captured.

The captured reaction is transmitted, via network 208, to server 220, where, at 226, a trigger condition is identified. At 228, it is determined whether the captured reaction satisfies the trigger condition, and, if the trigger condition is satisfied, at 230, a prompt is generated based on the captured reaction. At 232, at least one of the portion of the media content item 218, the captured reaction and/or the prompt is transmitted to another computing device. In this example, at least one of the portion of the media content item 218, the captured reaction and/or the prompt is transmitted to a tablet 234 via the network 208. On receiving the at least one of the portion of the media content item 218, the captured reaction and/or the prompt, it, or they, are output 236 at the tablet 234. The server 220 may comprise a single physical, or virtual server. In other examples, the process associated with identifying the trigger condition; determining whether the captured reaction satisfies the trigger condition; generating the prompt; and/or transmitting a portion of the content item, captured reaction and/or prompt may take place on different physical, or virtual, servers and/or at the smart television 202. In some examples, the content item 218 may be transmitted from the same server 220 that is used to perform any of the aforementioned process steps. In other examples, the content item 218 may be transmitted from a different server to a server that is used to perform any of the aforementioned process steps.

Figure 3:
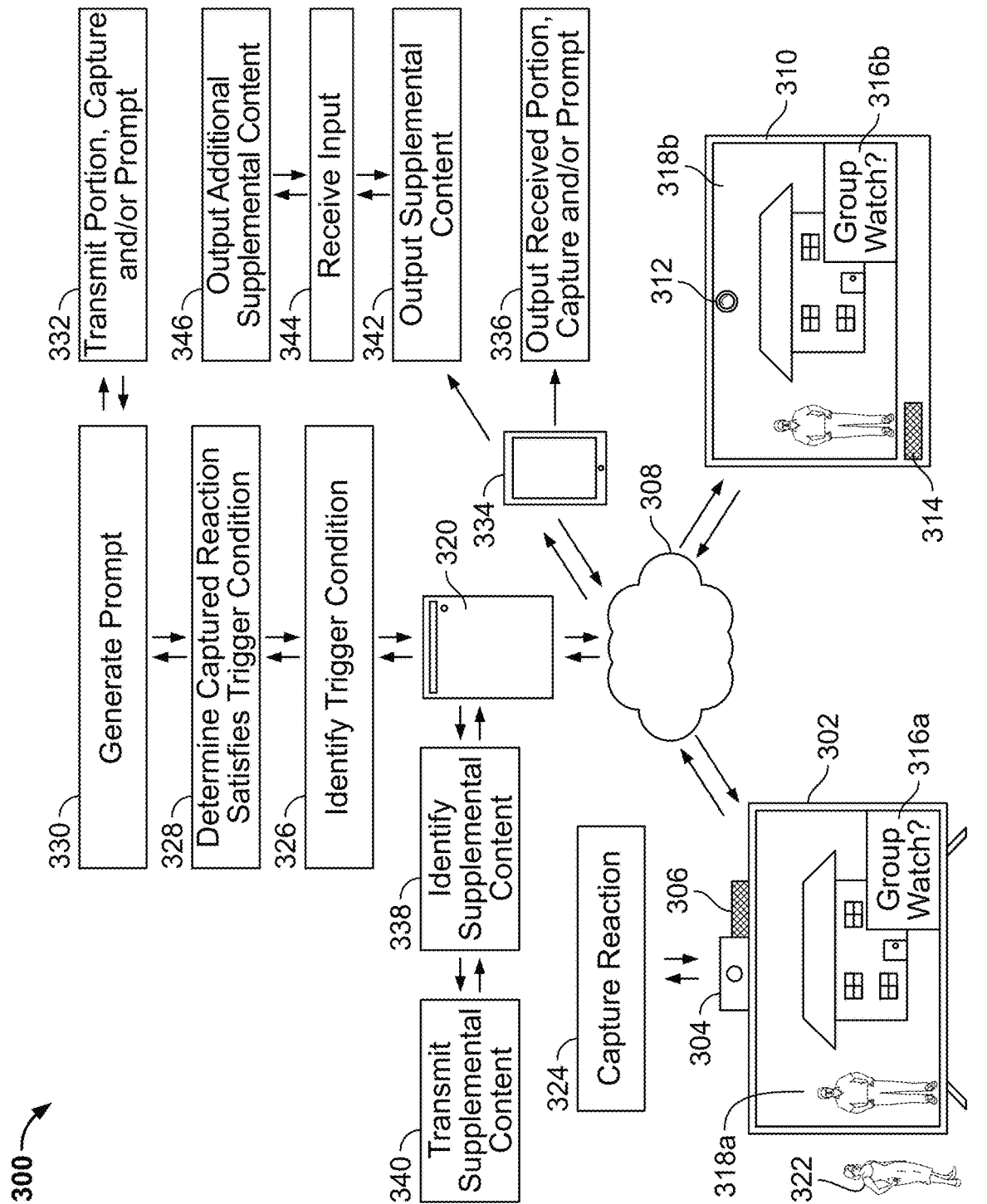
FIG. 3 shows another example environment for enabling enhanced group media session interactions, in accordance with some embodiments of the disclosure.

FIG. 3 shows another example environment for enabling enhanced group media session interactions, in accordance with some embodiments of the disclosure. In a similar manner to the environment shown in FIGS. 1 and 2, the environment 300 comprises a first computing device, in this example first smart television 302, a second computing device, in this example second smart television 310, and a server 320 that all communicate via network 308. Again, the network 308 may be any network including, for example, the internet. The first smart television 302 comprises a first integrated camera 304 and a first integrated microphone 306. The second smart television 310 comprises a second integrated camera 312 and a second integrated microphone 314. Although both the first and second smart televisions 302, 310 are shown with integrated cameras 304, 312 and microphones 306, 314, in other examples, one or more of the cameras and/or microphones may be external and/or not present at all. A group session is initiated between the two smart televisions 302, 310 via user interface elements 316a, 316b and server 320. In other examples, any known way of initiating a group session may be utilized. On initiating the group session, the first and second smart televisions receive one or more portions of the content item 318a, 318b and display the received portions at the same time, or substantially the same time. The content item 318a, 318b may be received via network 308 and from the server 320. While the content item 318a is being displayed at the first smart television 302, a first user 322 watches the content item 318a, and at 324, a reaction of the user is captured.

The captured reaction is transmitted, via network 308, to server 320, where, at 326, a trigger condition is identified. At 328, it is determined whether the captured reaction satisfies the trigger condition, and, if the trigger condition is satisfied, at 330, a prompt is generated based on the captured reaction. At 332, at least one of the portion of the media content item 318, the captured reaction and/or the prompt is transmitted to another computing device. In this example, at least one of the portion of the media content item 318, the captured reaction and/or the prompt is transmitted to a tablet 334 via the network 308. On receiving the at least one of the portion of the media content item 318, the captured reaction and/or the prompt, it, or they, are output 336 at the tablet 334.

In addition to generating a prompt at the server 320, at 328, supplemental content, such as an advertisement, is identified. At 340, the identified supplemental content is transmitted from the server 320, via network 308, to the tablet 334. In some examples, the supplemental content may be a static advertisement, such as an image. In other examples, the supplemental content may be a moving, or video, advertisement, such as a GIF and/or streamed video. At 342, the supplemental content is output at the tablet 334. The supplemental content may be output during playback of the content item 318, for example, during a commercial break. In other examples, the supplemental content may be output at the end of the content item 318. Where the supplemental content is interactive supplemental content, at 344, input from a user may be received. This may be via, for example, a touch event at a user interface element associated with the supplemental content. In other examples, the input may be voice input received via a microphone of the tablet 334, or the input may be received via a computing device associated with the tablet 334, such as a smart speaker (not shown). In a further example, the tablet 334 may be replaced by an extended reality device, and the input may be received via the extended reality device. On receiving the input, at 346, additional supplemental content may be output at the tablet. The additional supplemental content may be accessed locally, for example, it may be transmitted to the tablet 334 at the same time as the original supplemental content. In another example, the additional supplemental content may be received from server 320, via network 308, in response to the input. The server 320 may comprise a single physical, or virtual server. In other examples, the process associated with identifying the trigger condition; determining whether the captured reaction satisfies the trigger condition; generating the prompt; transmitting a portion of the content item, captured reaction and/or prompt; and/or the process steps associated with the supplemental content may take place on different physical, or virtual, servers and/or at the smart television 302. In some examples, the content item 318 may be transmitted from the same server 320 that is used to perform any of the aforementioned process steps. In other examples, the content item 318 may be transmitted from a different server to a server that is used to perform any of the aforementioned process steps.

Figure 4:
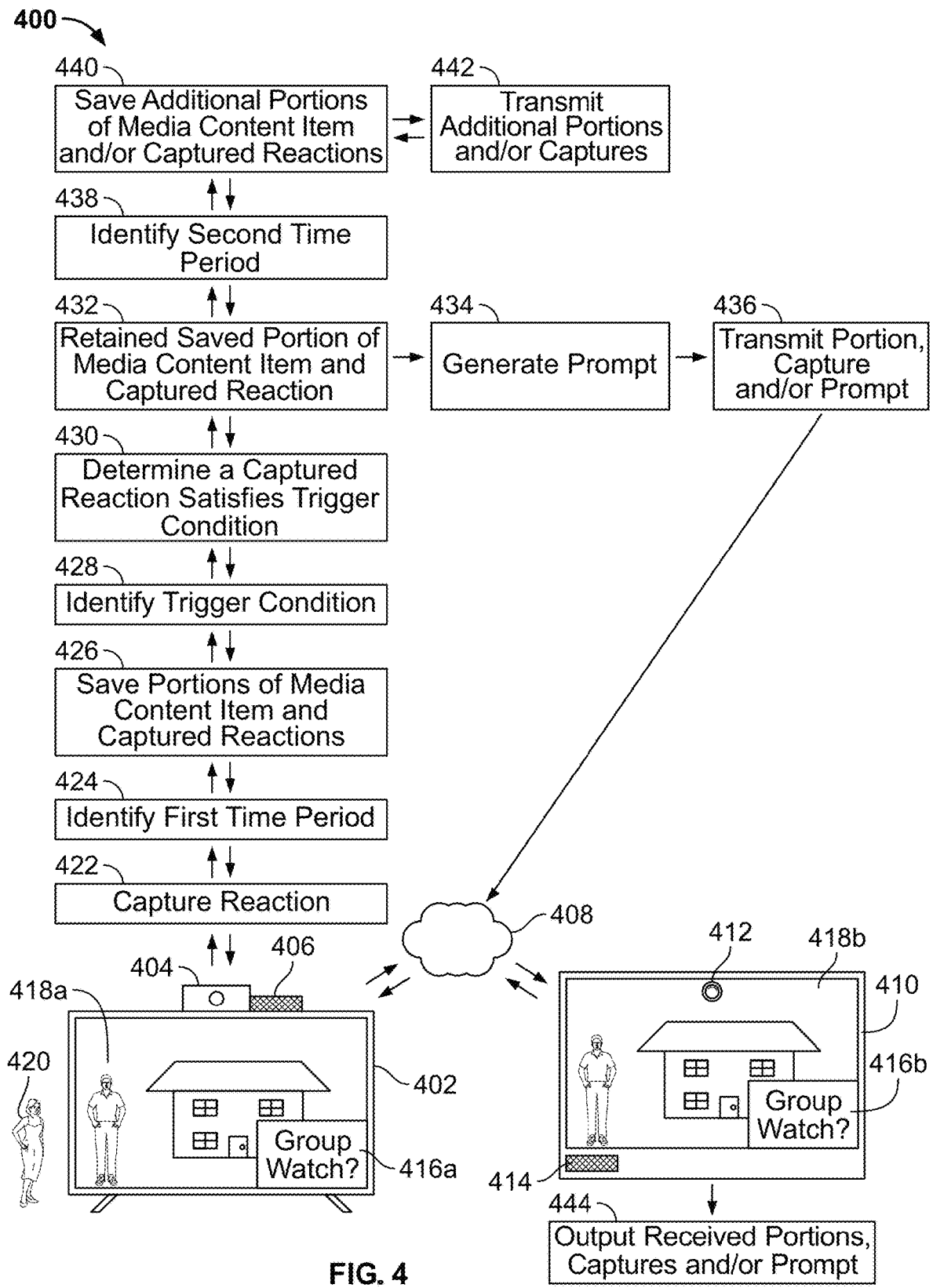
FIG. 4 shows another example environment for enabling enhanced group media session interactions, in accordance with some embodiments of the disclosure.

FIG. 4 shows another example environment for enabling enhanced group media session interactions, in accordance with some embodiments of the disclosure. In a similar manner to the environment shown in FIGS. 1-3, the environment 400 comprises a first computing device, in this example first smart television 402, that communicates via network 408 with a second computing device, in this example second smart television 410. The network 408 may be any network including, for example, the internet. The first smart television 402 comprises a first integrated camera 404 and a first integrated microphone 406. The second smart television 410 comprises a second integrated camera 412 and a second integrated microphone 414. Although both the first and second smart televisions 402, 410 are shown with integrated cameras 404, 412 and microphones 406, 414, in other examples, one or more of the cameras and/or microphones may be external and/or not present at all. A group session is initiated between the two smart televisions 402, 410 via user interface elements 416a, 416b. In other examples, any known way of initiating a group session may be utilized. On initiating the group session, the first and second smart televisions receive one or more portions of the content item 418a, 418b and display the received portions at the same time, or substantially the same time. The content item 418a, 418b may be received via network 408. While the content item 418a is being displayed at the first smart television 402, a first user 420 watches the content item 118a, and at 422, a reaction of the user is captured. At 424, a first time period is identified, for example, five, 10, 15 or 20 seconds, and at 426, portions of the media content item and captured reactions that have been received during the time period are saved. In some examples, these are saved to a storage of the smart television 402. In other examples, one, or both, are transmitted, via a network (not shown), to a server (also not shown), where they are stored. In a further example, the media content item may be stored at a server, and metadata associated timestamps corresponding to the start and the end of the time period may be saved, instead of a portion of the content item itself. In some examples, the saved portions of the media content item and/or the captured reactions may be deleted from the storage after the time period.

At 428, a trigger condition is identified, and at 430, it is determined whether the captured reaction satisfies the trigger condition. If the trigger condition is satisfied, at 432, the saved portion of media content item and/or captured reaction is retained. At 434, a prompt is generated based on the captured reaction. At 436, at least one of the portion of the media content item 418, the captured reaction and/or the prompt is transmitted to another computing device. In this example, at least one of the portion of the media content item 418, the captured reaction and/or the prompt is transmitted to the second smart television 410 via, for example, the network 408. On receiving the at least one of the portion of the media content item 418, the captured reaction and/or the prompt, it, or they, are output 444 at the second smart television 410. In some examples, at 438, a second time period may be identified and additional portions of media content item 418 and/or captured reactions may be saved. The first and second time periods may enable a buffer of additional portions of media content item and/or captured reactions to be saved, in addition to the media content item and/or captured reactions at the point the trigger condition is satisfied. These saved additional portions of media content item 418 and/or captures may, at 442, be transmitted to the second smart television 410, where they may also be generated for output. In other examples, any of the process steps may take place at a server, in a manner similar to that described in connection with FIGS. 2 and 3. In a similar manner, the step 444 may take place at an additional computing device, such as a tablet, again in a manner similar to that described in connection with FIGS. 2 and 3.

Figure 5:
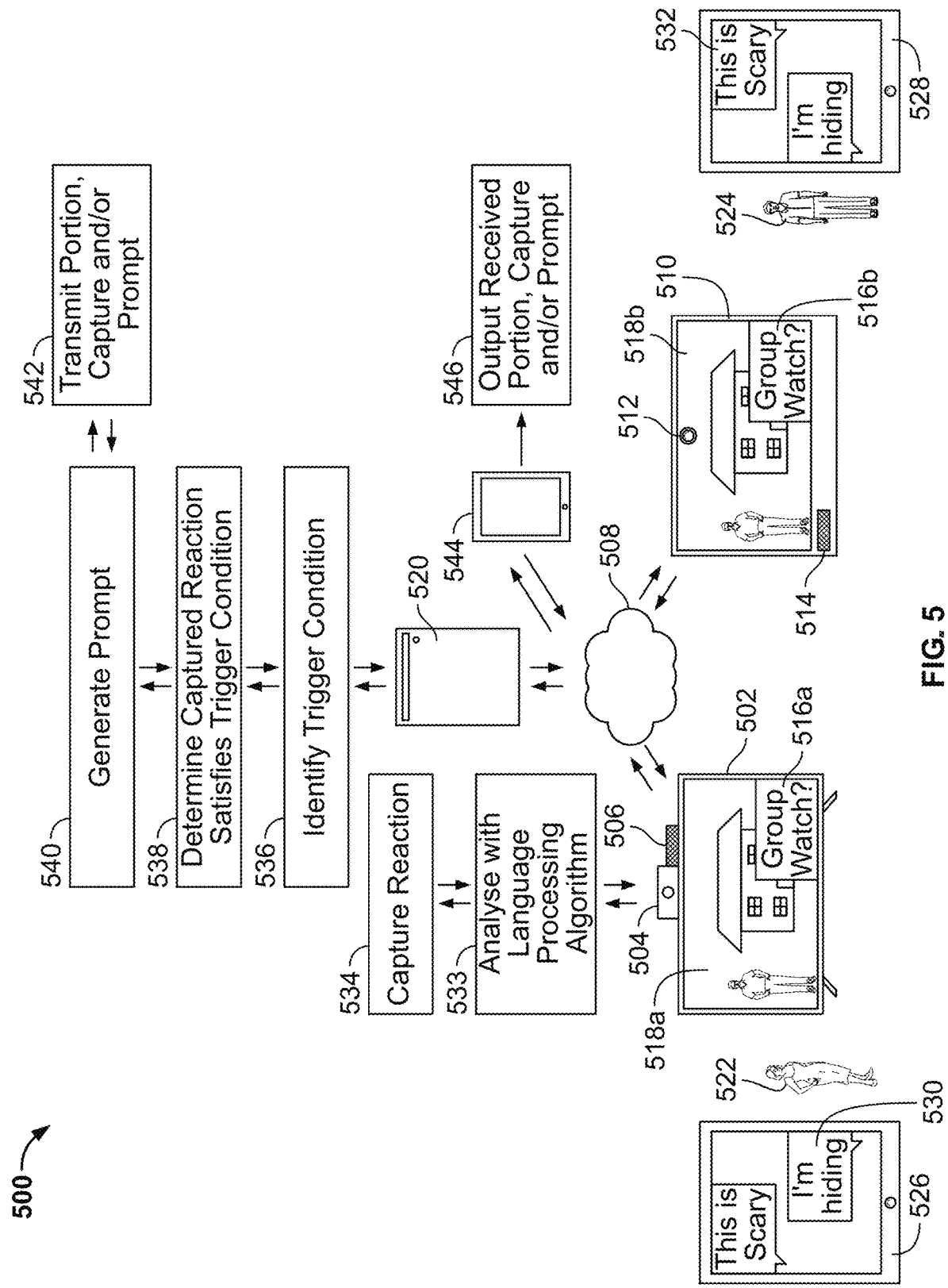
FIG. 5 shows another example environment for enabling enhanced group media session interactions, in accordance with some embodiments of the disclosure.

FIG. 5 shows another example environment for enabling enhanced group media session interactions, in accordance with some embodiments of the disclosure. In a similar manner to the environment shown in FIGS. 1-4, the environment 500 comprises a first computing device, in this example first smart television 502, a second computing device, in this example second smart television 510, and a server 520 that all communicate via network 508. Again, the network 508 may be any network including, for example, the internet. The first smart television 502 comprises a first integrated camera 504 and a first integrated microphone 506. The second smart television 510 comprises a second integrated camera 512 and a second integrated microphone 514. Although both the first and second smart televisions 502, 510 are shown with integrated cameras 504, 512 and microphones 506, 514, in other examples, one or more of the cameras and/or microphones may be external and/or not present at all. A group session is initiated between the two smart televisions 502, 510 via user interface elements 516a, 516b and server 520. In other examples, any known way of initiating a group session may be utilized. On initiating the group session, the first and second smart televisions receive one or more portions of the content item 518a, 518b and display the received portions at the same time, or substantially the same time. The content item 518a, 518b may be received via network 508 and from the server 520. While the content item 518a is being displayed at the first smart television 502, a first user 522 watches the content item 518a, and while the content item is being displayed at the second smart television 510, a second user 524 also watches the content item 518b. In this example, first and second additional computing devices, smartphones 526, 528, are associated with the first and second users 522, 524. The first user 522 reacts to the content item 518 by sending a first text message 530, with the first smartphone 526, to the second smartphone 528. The second user 524 receives the first text message via the second smart phone 528 and responds to the first user 522 by sending a second text message 532. Although the users 522, 524 interact via smartphones 526, 528 in this example, they may interact in a similar manner via their respective smart televisions 502, 510. In another example, the users may interact with each other via voice, rather than text. The text messages and/or voice may be transmitted via an application that is provided by the OTT platform and/or is associated with the OTT platform, for example, the OTT platform may be able to access text and/or audio of a third party application via an application programming interface (API).

At 533, the text and/or voice communications between the two users 522, 524 are analyzed with a language processing algorithm, and, at 534, the reaction is captured. At 534, only the output of the analyzing may be captured, or both the output of the processing and the text and/or voice that was processed may be captured as well. Automatic speech recognition and/or natural language processing algorithms can be used to process voice and/or text messages. These algorithms can be deployed to detect the emotion associated with the content item, for example, sadness, happiness, confusion, anxiety, curiosity, and/or excitement. In addition, known natural language processing techniques can be used to classify the reaction, such as agreement or disagreement, an interruption, an unanswered question, different topics, and/or intent classification. The captured reaction is transmitted, via network 508, to server 520. In other examples, the text messages and/or voice may be transmitted directly to server 520, and steps 522 and 534 may take place at the server. At 536, a trigger condition is identified. At 538, it is determined whether the captured reaction satisfies the trigger condition, and, if the trigger condition is satisfied, at 540 a prompt is generated based on the captured reaction. At 542, at least one of the portion of the media content item 518, the captured reaction and/or the prompt is transmitted to another computing device. In this example, at least one of the portion of the media content item 518, the captured reaction and/or the prompt is transmitted to a tablet 544 via the network 508. On receiving the at least one of the portion of the media content item 518, the captured reaction and/or the prompt, it, or they, are output 546 at the tablet 544. The server 520 may comprise a single physical, or virtual server. In other examples, the process associated with identifying the trigger condition; determining whether the captured reaction satisfies the trigger condition; generating the prompt; and/or transmitting a portion of the content item, captured reaction and/or prompt may take place on different physical, or virtual, servers and/or at the smart television 502. n some examples, the content item 518 may be transmitted from the same server 520 that is used to perform any of the aforementioned process steps. In other examples, the content item 518 may be transmitted from a different server to a server that is used to perform any of the aforementioned process steps.

Figure 6:
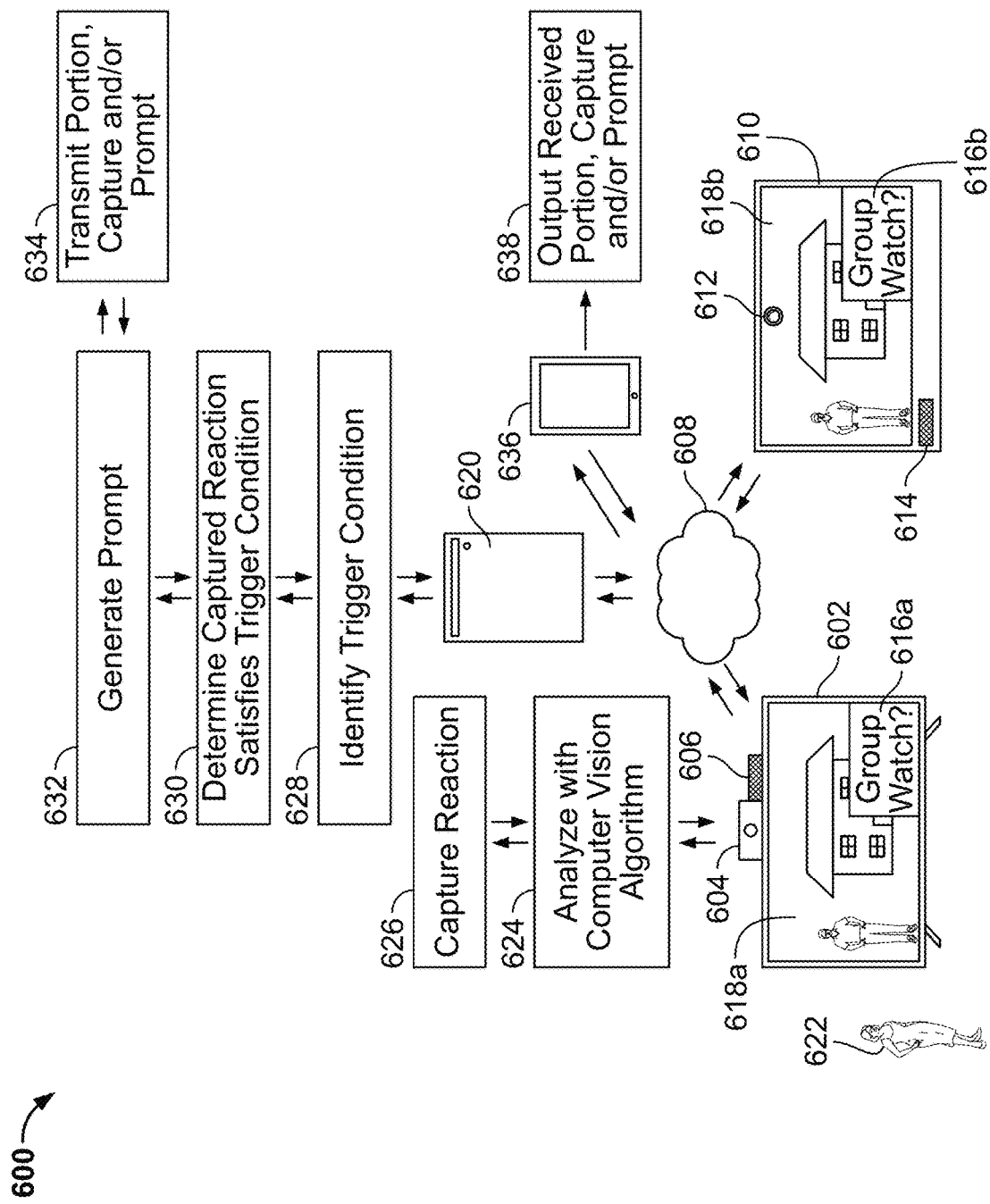
FIG. 6 shows another example environment for enabling enhanced group media session interactions, in accordance with some embodiments of the disclosure.

FIG. 6 shows another example environment for enabling enhanced group media session interactions, in accordance with some embodiments of the disclosure. In a similar manner to the environment shown in FIGS. 1-5, the environment 600 comprises a first computing device, in this example first smart television 602, a second computing device, in this example second smart television 610, and a server 620 that all communicate via network 608. Again, the network 608 may be any network including, for example, the internet. The first smart television 602 comprises a first integrated camera 604 and a first integrated microphone 606. The second smart television 610 comprises a second integrated camera 612 and a second integrated microphone 614. Although both the first and second smart televisions 602, 610 are shown with integrated cameras 604, 612 and microphones 606, 614, in other examples, one or more of the cameras and/or microphones may be external and/or not present at all. A group session is initiated between the two smart televisions 602, 610 via user interface elements 616a, 616b and server 620. In other examples, any known way of initiating a group session may be utilized. On initiating the group session, the first and second smart televisions receive one or more portions of the content item 618a, 618b and display the received portions at the same time, or substantially the same time. The content item 618a, 618b may be received via network 608 and from the server 620. While the content item 618a is being displayed at the first smart television 602, a first user 622 watches the content item 618a. As the user watches the content item, an image, series of images or representative data, such as a point cloud, of the user is collected. This may be via camera 604, via an external camera (including a camera of a smartphone) and/or via a Microsoft Kinect device. In some examples, a user may be on a video call with a second user (not shown) and visual data from the video call may be captured, in a similar manner to the captured text message and/or voice data described in connection with FIG. 5.

At 624, the capture of the first user 622 is analyzed with a computer vision algorithm, and, at 626, the reaction is captured. For example, an emotion of the first user 622 may be identified via the computer vision algorithm. The computer vision algorithm may be deployed to detect the facial expression and/or gestures of the first user 622. These may be used to detect the emotion and interest level of the first user 622 at that moment. At 626, only the output of the analyzing may be captured, or both the output of the analyzing and the capture of the first user 622 that was processed may be captured as well. The captured reaction is transmitted, via network 608, to server 620. In other examples, the text messages and/or voice may be transmitted directly to server 620, and steps 624 and 626 may take place at the server. At 628, a trigger condition is identified. At 630, it is determined whether the captured reaction satisfies the trigger condition, and, if the trigger condition is satisfied, at 632 a prompt is generated based on the captured reaction. At 634, at least one of the portion of the media content item 618, the captured reaction and/or the prompt is transmitted to another computing device. In this example, at least one of the portion of the media content item 618, the captured reaction and/or the prompt is transmitted to a tablet 636 via the network 608. On receiving the at least one of the portion of the media content item 618, the captured reaction and/or the prompt, it, or they, are output 638 at the tablet 636. The server 620 may comprise a single physical, or virtual server. In other examples, the process associated with identifying the trigger condition; determining whether the captured reaction satisfies the trigger condition; generating the prompt; and/or transmitting a portion of the content item, captured reaction and/or prompt may take place on different physical, or virtual, servers and/or at the smart television 602. In some examples, the content item 618 may be transmitted from the same server 620 that is used to perform any of the aforementioned process steps. In other examples, the content item 618 may be transmitted from a different server to a server that is used to perform any of the aforementioned process steps.

Figure 7:
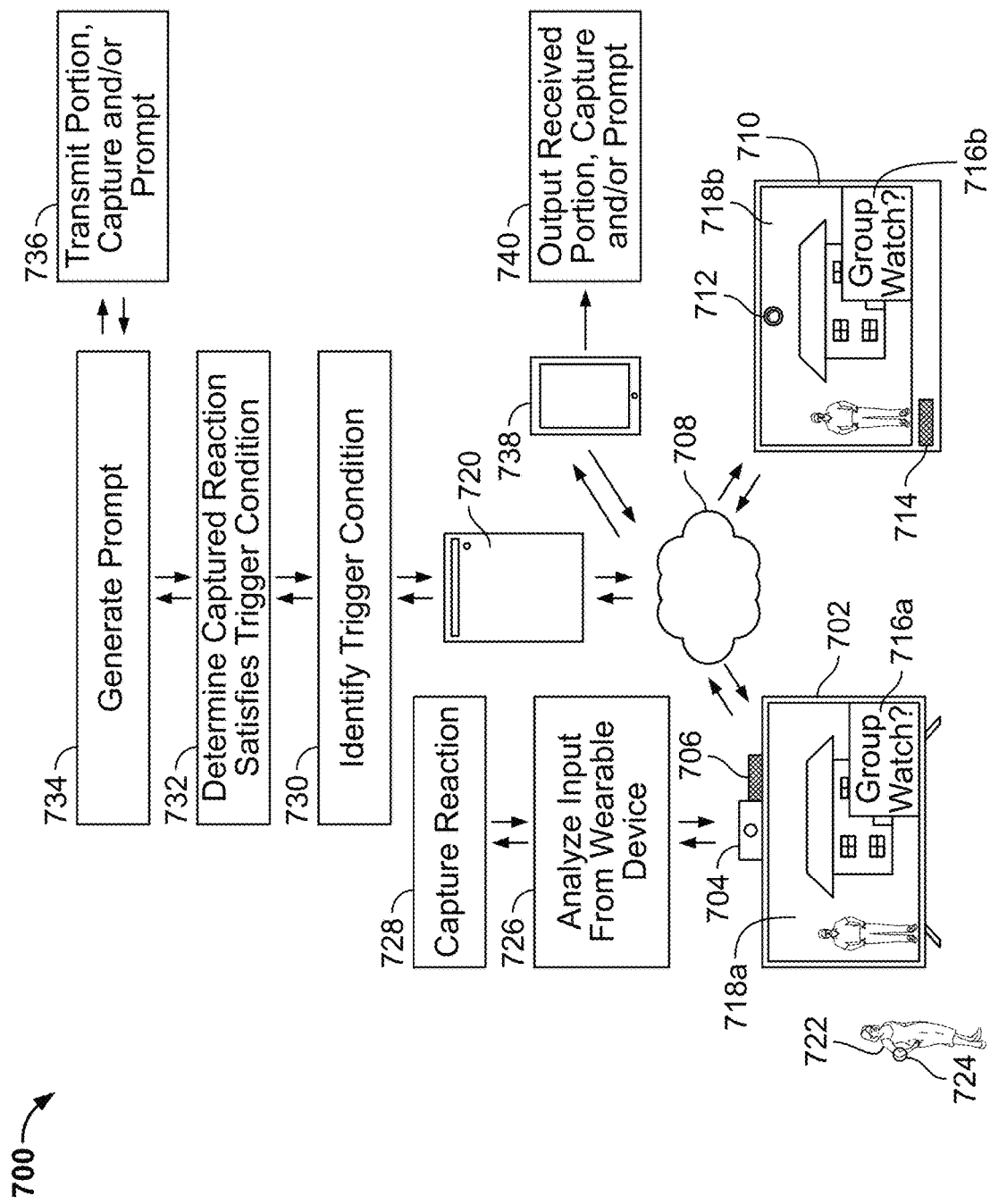
FIG. 7 shows another example environment for enabling enhanced group media session interactions, in accordance with some embodiments of the disclosure.

FIG. 7 shows another example environment for enabling enhanced group media session interactions, in accordance with some embodiments of the disclosure. In a similar manner to the environment shown in FIGS. 1-6, the environment 700 comprises a first computing device, in this example first smart television 702, a second computing device, in this example second smart television 710, and a server 720 that all communicate via network 708. Again, the network 708 may be any network including, for example, the internet. The first smart television 702 comprises a first integrated camera 704 and a first integrated microphone 706. The second smart television 710 comprises a second integrated camera 712 and a second integrated microphone 714. Although both the first and second smart televisions 702, 710 are shown with integrated cameras 704, 712 and microphones 706, 714, in other examples, one or more of the cameras and/or microphones may be external and/or not present at all. A group session is initiated between the two smart televisions 702, 710 via user interface elements 716a, 716b and server 720. In other examples, any known way of initiating a group session may be utilized. On initiating the group session, the first and second smart televisions receive one or more portions of the content item 718a, 718b and display the received portions at the same time, or substantially the same time. The content item 718a, 718b may be received via network 708 and from the server 720. While the content item 718a is being displayed at the first smart television 702, a first user 722 watches the content item 718a. As the first user 722 watches the content item, a wearable device, in this example, smartwatch 724 analyzes user data. In this example, the smartwatch 724 analyzes heartrate data. In other examples, a wearable device may monitor the brainwaves of the first user 722.

At 726, the input from the smartwatch 724 is analyzed, and, at 728, the reaction is captured. For example, the heartrate of the user may be analyzed to determine points at which the heartrate has increased relative to a baseline heartrate and/or increased more than a threshold amount. A relatively high heartrate may be indicative of the user reacting to a part of the content item 718. In another example, an input from a wearable device can be used to detect emotion and/or reactions during the content item. For example, emotive headgear can record brainwaves and interpret the results to provide information about brain activity, such as level of attention, focus, engagement, interest, excitement, affinity, relaxation, and/or stress. An Empatica wristband device can monitor any changes in a user's skin that can indicate stress, emotions, and/or excitement. The Empatica wristband may also monitor heart rate and/or track motions. At 728, only the output of the analyzing may be captured, or both the output of the analyzing and the capture of the first user 722 that was processed may be captured as well. The captured reaction is transmitted, via network 708, to server 720. In other examples, the output of the smartwatch 724 may be transmitted directly to server 720, and steps 726 and 728 may take place at the server. At 730, a trigger condition is identified. At 732, it is determined whether the captured reaction satisfies the trigger condition, and, if the trigger condition is satisfied, at 734 a prompt is generated based on the captured reaction. At 736, at least one of the portion of the media content item 718, the captured reaction and/or the prompt is transmitted to another computing device. In this example, at least one of the portion of the media content item 718, the captured reaction and/or the prompt is transmitted to a tablet 738 via the network 708. On receiving the at least one of the portion of the media content item 718, the captured reaction and/or the prompt, it, or they, are output 740 at the tablet 738. The server 720 may comprise a single physical, or virtual server. In other examples, the process associated with identifying the trigger condition; determining whether the captured reaction satisfies the trigger condition; generating the prompt; and/or transmitting a portion of the content item, captured reaction and/or prompt may take place on different physical, or virtual, servers and/or at the smart television 702. In some examples, the content item 718 may be transmitted from the same server 720 that is used to perform any of the aforementioned process steps. In other examples, the content item 718 may be transmitted from a different server to a server that is used to perform any of the aforementioned process steps.

In other examples, user reactions may be determined via a majority voting ensemble algorithm. A majority voting ensemble algorithm may benefit from there being multiple participants, multiple signal sources and multiple models for emotion detection in a group session. Higher performance may be achieved by the ensemble classifiers when determining detection accuracy. In another example, natural language processing may be utilized to summarize interactions between participants and/or for prompt generation.

Figure 8:
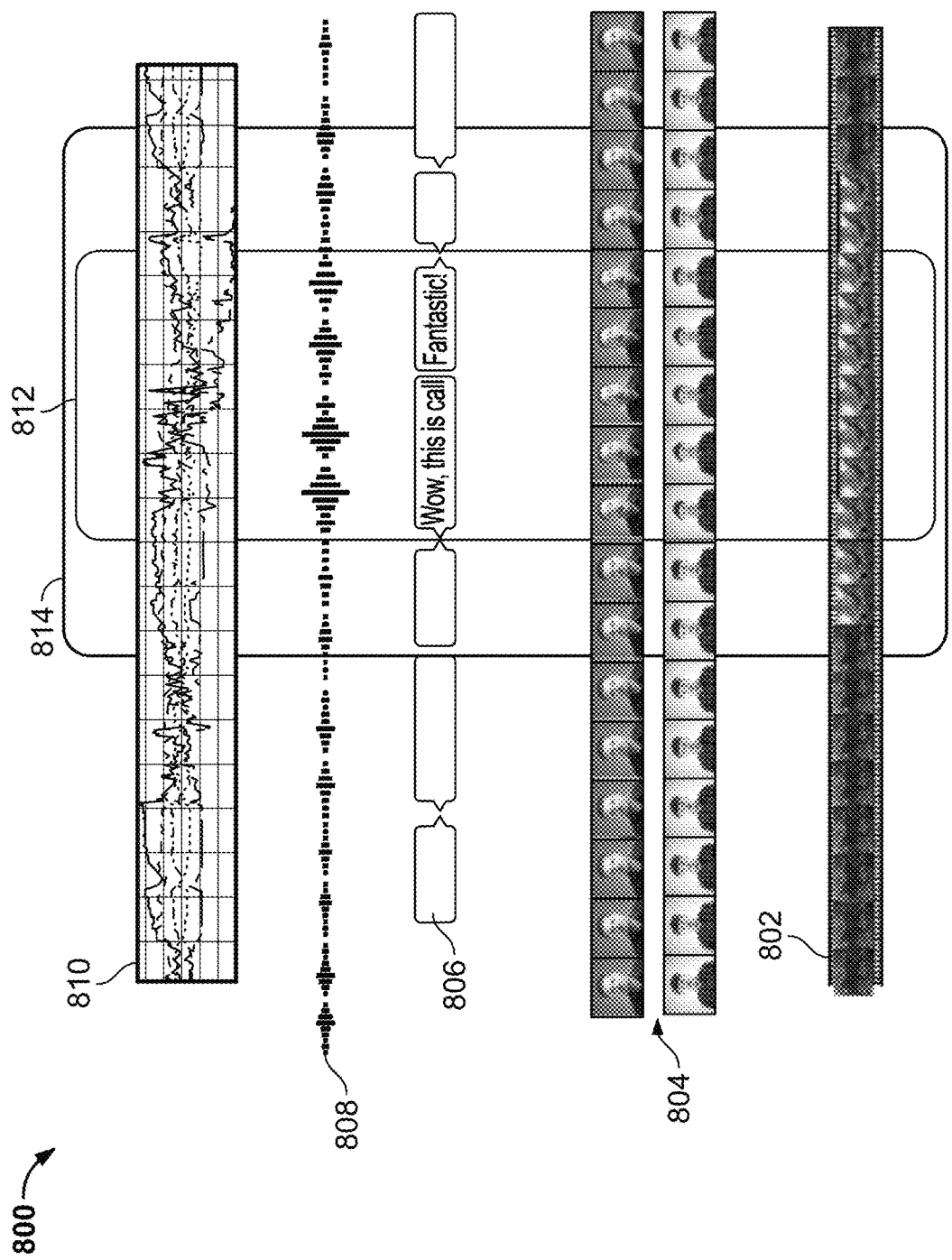
FIG. 8 shows another example environment for enabling enhanced group media session interactions, in accordance with some embodiments of the disclosure.

FIG. 8 shows another example environment for enabling enhanced group media session interactions, in accordance with some embodiments of the disclosure. The environment 800 depicts a continuous capture and saving system, where a media item 802 and various user reactions, such as input from a camera 804, text messages 806, audio 808 and brainwaves 810 are captured. During a first time period 812, the captures are analyzed to identify whether a trigger condition has been satisfied. If the trigger condition has been satisfied, one or more of the media content item 802 and the captures 804, 806, 808, 810 are saved, including for an additional duration, a second time period 814 larger than the first time period 812. The second time period 814 may be for a duration that is before and/or after the first time period 812.

During a group session, a computing device may continuously record the media content item 802, together with the real-time data collected from various wearable sensors, voice and text chat and/or cameras from all participants, or a sub-set of participants in the group session. The recorded media content item 802 and/or data may be saved locally, for example, at a smart television and/or remotely, for example, at a server. In order to, for example, save processing and/or storage resources, the system may retain only the most recent history with a sliding window. For example, only the past 10 seconds of media content item and reaction data may be retained if a trigger condition is not satisfied. Once a trigger condition is satisfied, then the past, for example, 10 seconds may be retained, along with the captured reaction and/or portion of the media content item 802. The captured reaction and/or portion of the media content item 802 may also be retained for a second period, for example, 10 seconds, after a triggering event ends. In this example, the resultant captured duration will include the detected duration and front and end padding (in the aforementioned example, the two 10 second periods). In some examples, to avoid duplicate storage of the media content item, the captured portion of the media content item 802 content may be stored using metadata, such as the start and end time of the media content item 802 portion.

Figure 9:
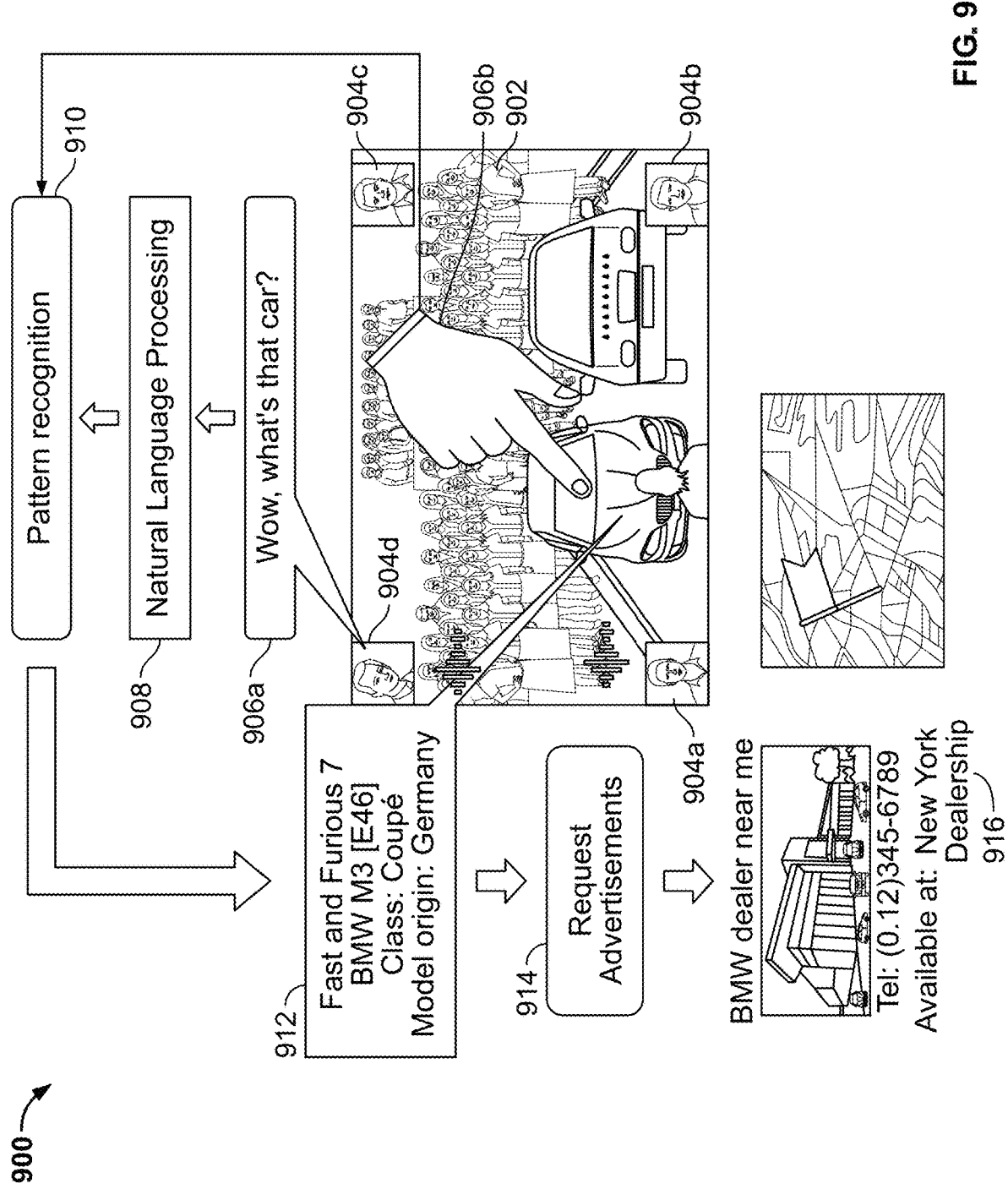
FIG. 9 shows example supplementary content, in accordance with some embodiments of the disclosure.

FIG. 9 shows example supplementary content, in accordance with some embodiments of the disclosure. The environment 900 comprises a supplemental content item, in this example, an interactive supplemental content item 902. One or more users 904a, 904b, 904c, 904d interact with the supplemental content 902. Each of the one or more users 904a, 904b, 904c, 904d may interact with the content on their individual device and/or on a shared device, in real time or asynchronously. In a first example, one of the users responds to the supplemental content 902 by providing spoken input 906a, "Wow, what's that car?" At 908, natural language processing is used to determine what object the user is referring to in the interactive content item 902. In a second example, a user interacts with the supplemental content 902 by providing touch input 906b, by selecting a car in the interactive content item 902. In this example, it is clear what object the user is referring to, as they have selected a car. At 910, pattern recognition is performed for both examples, and, at 912, detail about the indicated and/or selected object is identified. Based on the identified detail, an advertisement is requested at 914. At 916, an advertisement is generated for output based on the provided input 906a, 906b.

In some examples, the supplemental content may be an advertisement. For example, an advertisement may be generated if it is identified that a user is interested in, for example, an object in the content item. A participant in the group session may ask what kind car was shown in the content item. This question in itself may not provide enough information on what exact object the user was asking about. However, this query may satisfy a trigger condition, and the query, along with a portion of the content item, may be saved and they may be generated for output at a computing device after the group session. In an interaction after the group session, interactive supplemental content may be presented to the user, and the user may be asked to use their finger, or mouse, to indicate where the car is in the saved portion of the media content item. This may provide contextual information to enable, for example, a computer vision algorithm to efficiently recognize and segment the car. Then the computer vision algorithm result may be fed into, and searched in an, for example, advertisement network. The system may then present more detailed information about this car and where to buy it to a user. Since the user is no longer engaged in watching the content item, they may be more willing to engage with the advertisement.

Figure 10:
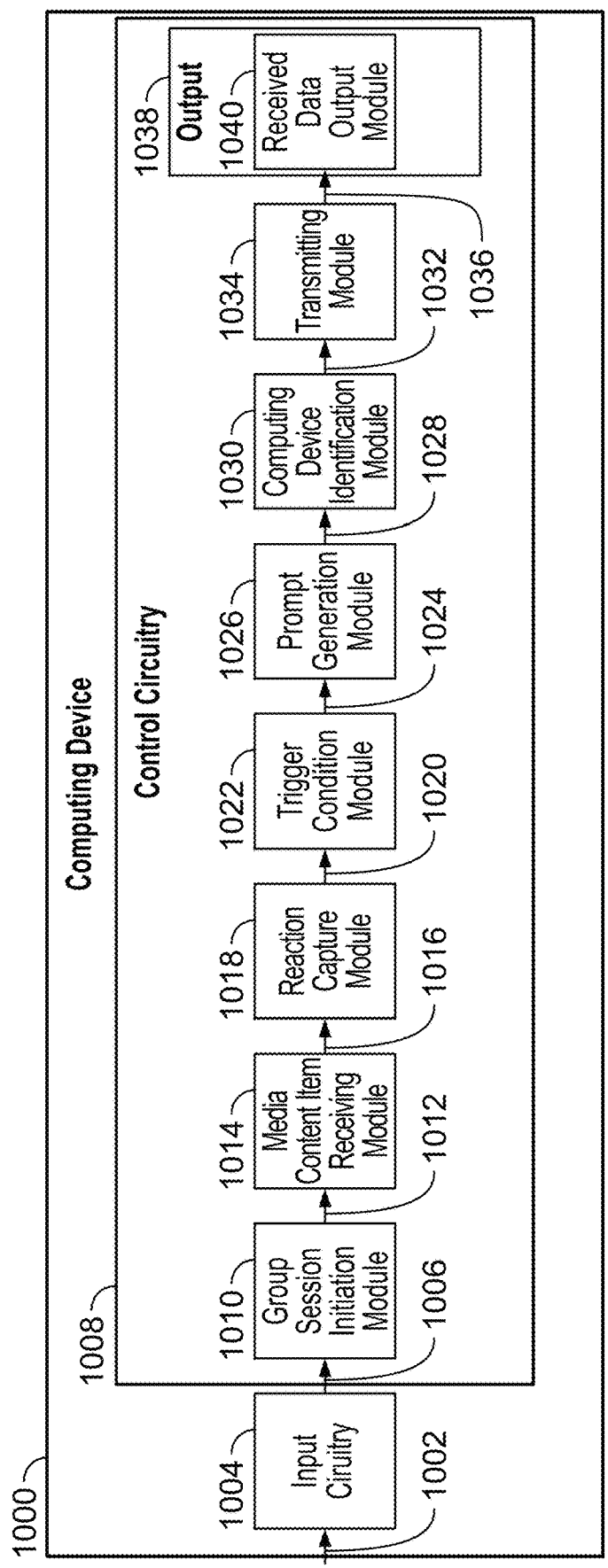
FIG. 10 shows a block diagram representing components of a computing device and dataflow therebetween for enabling enhanced group media session interactions, in accordance with some embodiments of the disclosure.

FIG. 10 shows a block diagram representing components of a computing device and dataflow therebetween for enabling enhanced group media session interactions, in accordance with some embodiments of the disclosure. Computing device 1000 (e.g., computing device 102, 202, 302, 402, 502, 602, 702), as discussed above, comprises input circuitry 1004 and control circuitry 1008. Control circuitry 1008 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

Input is received 1002 by the input circuitry 1004. The input circuitry 1002 is configured to received inputs related to a computing device. For example, this may be via a touchscreen, a keyboard, a mouse, a microphone and/or a camera in communication with the computing device 1000. In other examples, this may be via a gesture detected via an augmented, mixed and/or virtual reality device. In another example, the input may comprise instructions received via another computing device, for example, a smart speaker. The input circuitry 1004 transmits 1006 the user input to the control circuitry 1008.

The control circuitry 1008 comprises a group session initiation module 1010, a media content item receiving module 1014, a reaction capture module 1018, a trigger condition module 1022, a prompt generation module 1026, a computing device identification module 1030, a transmitting module 1034, and an output module 1038 comprising a received data output module 1040. The input is transmitted 1006 to the group session initiation module 1010, where a group session is initiated. On initiation of the group session, an indication is transmitted 1012 to the media content item receiving module 1014, where a media content item is requested and received. On receiving the media content item, and indication is transmitted 1016 to a reaction capture module, where a reaction of a user is captured. The captured reaction of the user is transmitted 1020 to the trigger condition module 1022, where a trigger condition is identified and it is determined whether the captured reaction satisfies the trigger condition. If the captured reaction satisfies the trigger condition, then the captured reaction is transmitted 1024 to the prompt generation module 1026, where a prompt is generated based on the media content item and/or the captured reaction. The generated prompt is transmitted 1028 to the computing device identification module 1030, where a computing device is identified for receiving at least one of a portion of the media content item, the captured reaction and/or the prompt. The identified computing device and the at least one of a portion of the media content item, the captured reaction and/or the prompt is transmitted 1032 to the transmitting module 1034, where it is transmitted 1036 to the identified computing device. At the output module 1038, the received at least one of a portion of the media content item, the captured reaction and/or the prompt is generated for output at the received data output module 1040.

Figure 11:
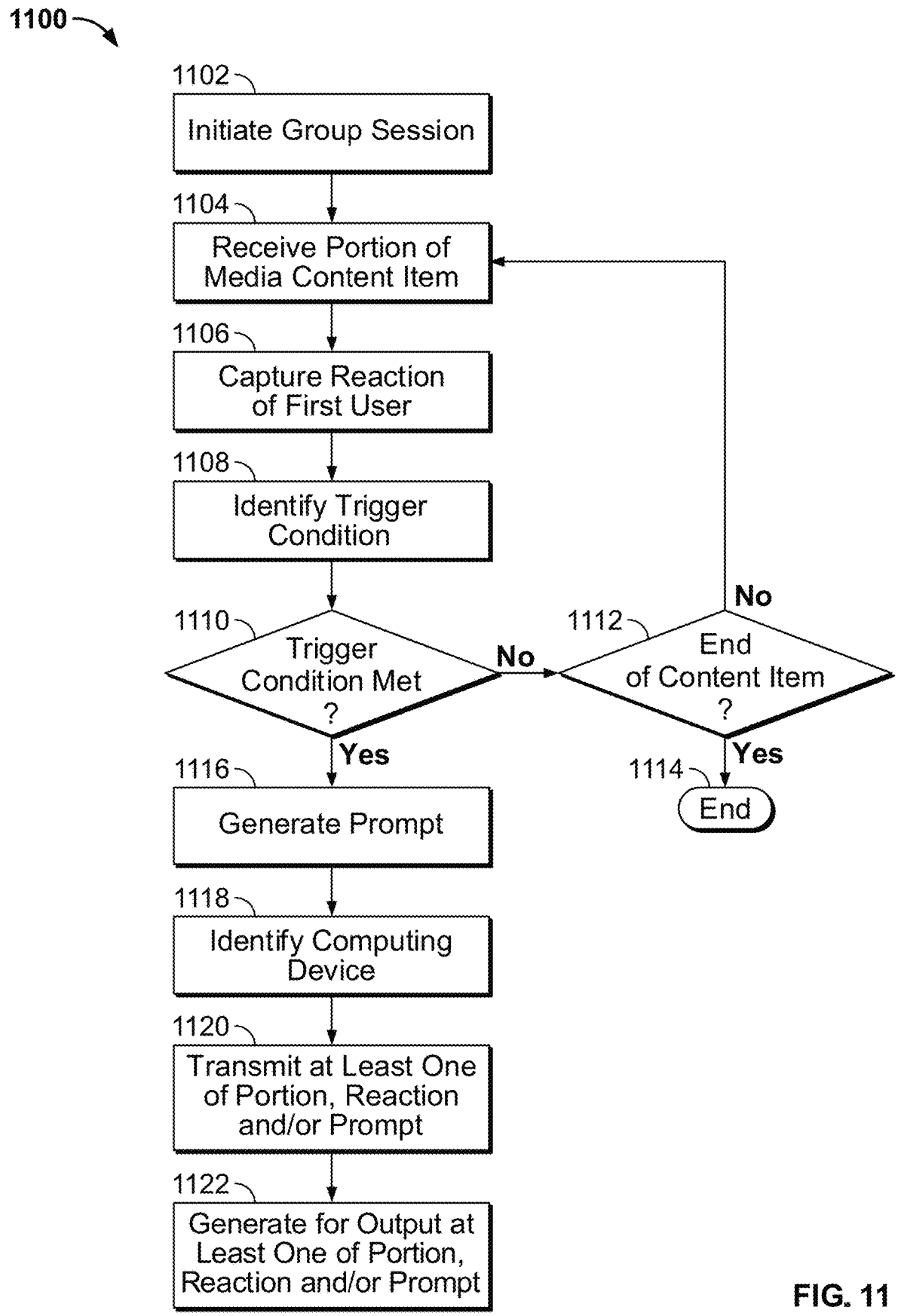
FIG. 11 shows a flowchart of illustrative steps involved in enabling enhanced group media session interactions, in accordance with some embodiments of the disclosure.

FIG. 11 shows a flowchart of illustrative steps involved in enabling enhanced group media session interactions, in accordance with some embodiments of the disclosure. Process 1100 may be implemented on any of the aforementioned computing devices (e.g., computing device 102, 202, 302, 402, 502, 602, 702). In addition, one or more actions of the process 1100 may be incorporated into or combined with one or more actions of any other process or embodiments described herein.

At 1102, a group session is initiated between at least a first computing device and a second computing device. At 1104, a portion of a media content item is received. At 1106, a reaction of a first user is captured, and at 1108 a trigger condition is identified. At 1110, it is determined whether the captured reaction of the first user meets the trigger condition. If it does not, the process proceeds to step 1112, where it is determined whether the content item has finished. If the content item has finished, then the process proceeds to step 1114, where the process ends. Otherwise, if the content item has not finished, then the process loops to step 1104. Returning to step 1110, if the trigger condition is met, at 1116, a prompt is generated. At 1118, a computing device is identified, and, at 1120, at least one of the portion of the media content item, the captured reaction and/or the prompt is transmitted to the identified computing device. At 1122, the received at least one of the portion of the media content item, the captured reaction and/or the prompt is generated for output at the identified computing device.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   initiating, between a first computing device and a second computing device, a group session for consuming a media content item;
   receiving, at the first computing device and the second computing device, a portion of the media content item;
   capturing, based at least in part on receiving the portion of the media content item, a reaction of a first user;
   identifying a trigger condition;
   determining that the captured reaction satisfies the trigger condition;
   in response to determining that the captured reaction satisfies the trigger condition, generating a prompt comprising a phrase that is based on the portion of the media content item and the captured reaction;
   identifying a computing device;
   transmitting, to the identified computing device, the prompt;
   causing the identified computing device to generate for output the prompt;
   causing to be displayed on the identified computing device at least one selectable option related to the prompt;
   receiving, from the identified computing device, a user input selecting one of the at least one selectable option; and
   causing to be displayed on the identified computing device content based on the selected option.

2. The method of claim 1, wherein the method further comprises:
   identifying, based on the captured reaction, supplemental content; and
   transmitting, to the identified computing device, the supplemental content, wherein the identified computing device is configured to generate for output the supplemental content.

3. The method of claim 2, wherein the supplemental content is interactive supplemental content comprising an interactive object, and the method further comprises:
   receiving, at the identified computing device, input associated with the interactive object, wherein the identified computing device is configured to generate for output additional supplemental content associated with the interactive object.

4. The method of claim 1, wherein:
   receiving a portion of the media content item further comprises receiving a plurality of portions of the media content item;
   capturing a reaction of the first user further comprises capturing a plurality of reactions of the first user;
   the method further comprises:
      identifying a first time period;
      saving, for the first time period, each of the plurality of portions of the media content item and each of the plurality of captured reactions; and, for each saved portion of the plurality of portions and each captured reaction of the plurality of captured reactions:
      determining that a captured reaction satisfies the trigger condition further comprises determining that the saved captured reaction satisfies the trigger condition;
      retaining the saved portion of the media content item and the captured reaction at the end of the first time period;
      generating a prompt further comprises generating a prompt based on the saved portion of the media content item and the saved captured reaction;
      transmitting at least one of the portion of the media content item, the captured reaction and the prompt to the identified computing device further comprises transmitting at least one of the saved portion of the media content item and the saved captured reaction to the identified computing device; and
      generating for output the at least one of the portion of the media content item, the captured reaction and the prompt further comprises generating for output, at the identified computing device, the at least one of the saved portion of the media content item and the saved captured reaction.

5. The method of claim 4, wherein:
   retaining the saved portion of the media content item and the captured reaction further comprises:
      identifying a second time period; and
      saving one or more additional portions of the media content item and/or additional captured reactions during the second time period, wherein the second time period starts at a time based on determining that the captured reaction satisfies the trigger condition;
transmitting the saved portion of the media content item, the saved captured reaction and the prompt further comprises transmitting the one or more additional portions of the media content item and/or additional captured reactions; and
generating for output the at least one of the saved portion of the media content item, the saved captured reaction and the prompt further comprises generating for output the one or more additional portions of the media content item and/or additional captured reactions.

6. The method of claim 1, wherein the method further comprises:
saving the portion of the media content item;
identifying start time metadata associated with a start time of the media content item;
identifying end time metadata associated with an end time of the media content item; and
saving the start time metadata and the end time metadata.

7. The method of claim 1, wherein:
the method further comprises:
receiving a communication, wherein the communication is a communication transmitted from a first user associated with the first computing device to a second user associated with the second computing device; and
analyzing, with a language processing algorithm, the communication; and
determining that the captured reaction satisfies the trigger condition further comprises determining that the received communication satisfies the trigger condition.

8. The method of claim 1, wherein:
the method further comprises:
receiving a capture of a user face; and
analyzing, with a computer vision algorithm, the capture of the user face; and
determining that the captured reaction satisfies the trigger condition further comprises determining that the capture of the user face satisfies the trigger condition.

9. The method of claim 1, wherein:
the method further comprises:
receiving input from a wearable computing device; and
analyzing the input from the wearable computing device; and
determining that the captured reaction satisfies the trigger condition further comprises determining that the input from the wearable computing device satisfies the trigger condition.

10. The method of claim 1, wherein generating the prompt further comprises generating, with a language processing algorithm, a question.

11. A system comprising:
a communication port;
a memory storing instructions; and
control circuitry communicably coupled to the memory and the communication port and configured to execute instructions to:
initiate, between a first computing device and a second computing device and via the communication port, a group session for consuming a media content item;
receive, at the first computing device and the second computing device, a portion of the media content item;
capture, based at least in part on receiving the portion of the media content item, a reaction of a first user;
identify a trigger condition;
determine that the captured reaction satisfies the trigger condition;
in response to determining that the captured reaction satisfies the trigger condition, generate a prompt comprising a phrase that is based on the portion of the media content item and the captured reaction;
identify a computing device;
transmit, to the identified computing device, the prompt;
cause the identified computing device to generate for output the prompt;
cause to be displayed on the identified computing device at least one selectable option related to the prompt;
receive, from the identified computing device, a user input selecting one of the at least one selectable option; and
cause to be displayed on the identified computing device content based on the selected option.

12. The system of claim 11, wherein the control circuitry is further configured to:
identify, based on the captured reaction, supplemental content; and
transmit, to the identified computing device, the supplemental content, wherein the identified computing device is configured to generate for output the supplemental content.

13. The system of claim 12, wherein the supplemental content is interactive supplemental content comprising an interactive object, and the control circuitry is further configured to:
receive, at the identified computing device, input associated with the interactive object, wherein the identified computing device is configured to generate for output additional supplemental content associated with the interactive object.

14. The system of claim 11, wherein:
the control circuitry configured to receive a portion of the media content item is further configured to receive a plurality of portions of the media content item;
the control circuitry configured to capture a reaction of the first user is further configured to capture a plurality of reactions of the first user;
the control circuitry is further configured to:
identify a first time period;
save, for the first time period, the portion of the media content item and the captured reaction is further configured to save each of the plurality of portions of the media content item and each of the plurality of captured reactions; and, for each saved portion of the plurality of portions and each captured reaction of the plurality of captured reactions:
the control circuitry configured to determine that a captured reaction satisfies the trigger condition is further configured to determine that the saved captured reaction satisfies the trigger condition;
the control circuitry is further configured to retain the saved portion of the media content item and the captured reaction at the end of the first time period;
the control circuitry configured to generate a prompt is further configured to generate a prompt based on the saved portion of the media content item and the saved captured reaction;
the control circuitry configured to transmit at least one of the portion of the media content item, the captured reaction and the prompt to the identified computing device is further configured to transmit at least one of the saved portion of the media content item and the saved captured reaction to the identified computing device; and the control circuitry configured to generate for output the at least one of the portion of the media content item, the captured reaction and the prompt is further configured to generate for output, at the identified computing device, the at least one of the saved portion of the media content item and the saved captured reaction.

15. The system of claim 14, wherein:
the control circuitry configured to retain the saved portion of the media content item and the captured reaction is further configured to:
identify a second time period; and
save one or more additional portions of the media content item and/or additional captured reactions during the second time period, wherein the second time period starts at a time based on determining that the captured reaction satisfies the trigger condition;
the control circuitry configured to transmit the saved portion of the media content item, the saved captured reaction and the prompt is further configured to transmit the one or more additional portions of the media content item and/or additional captured reactions; and
the control circuitry configured to generate for output the at least one of the saved portion of the media content item, the saved captured reaction and the prompt is further configured to generate for output the one or more additional portions of the media content item and/or additional captured reactions.

16. The system of claim 11, wherein the control circuitry is further configured to:
save the portion of the media content item;
identify start time metadata associated with a start time of the media content item;
identify end time metadata associated with an end time of the media content item; and
save the start time metadata and the end time metadata.

17. The system of claim 11, wherein:
the control circuitry is further configured to:
receive a communication, wherein the communication is a communication transmitted from a first user associated with the first computing device to a second user associated with the second computing device; and
analyze, with a language processing algorithm, the communication; and
the control circuitry configured to determine that the captured reaction satisfies the trigger condition is further configured to determine that the received communication satisfies the trigger condition.

18. The system of claim 11, wherein:
the control circuitry is further configured to:
receive a capture of a user face; and
analyze, with a computer vision algorithm, the capture of the user face; and
the control circuitry configured to determine that the captured reaction satisfies the trigger condition is further configured to determine that the capture of the user face satisfies the trigger condition.

19. The system of claim 11, wherein:
the control circuitry is further configured to:
receive input from a wearable computing device; and
analyze the input from the wearable computing device; and
the control circuitry configured to determine that the captured reaction satisfies the trigger condition is further configured to determine that the input from the wearable computing device satisfies the trigger condition.

20. The system of claim 11, wherein the control circuitry configured to generate the prompt is further configured to generate, with a language processing algorithm, a question.

* * * * *